United States Patent
Thomas (10) Patent No.: US 11,440,596 B2
(45) Date of Patent: Sep. 13, 2022

(54) MOTOR VEHICLE FLOOR ASSEMBLY CONFIGURED TO FACILITATE ELECTRICAL CONNECTIONS AND AIRFLOW

(71) Applicant: FORD GLOBAL TECHNOLOGIES, LLC, Dearborn, MI (US)

(72) Inventor: Galen Keith Thomas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 256 days.

(21) Appl. No.: 17/012,399

(22) Filed: Sep. 4, 2020

(65) Prior Publication Data
US 2022/0073149 A1    Mar. 10, 2022

(51) Int. Cl.
| | | |
|---|---|---|
| B60J 7/00 | (2006.01) | |
| B62D 25/20 | (2006.01) | |
| B60R 16/02 | (2006.01) | |
| B60K 1/04 | (2019.01) | |
| B60R 16/023 | (2006.01) | |

(52) U.S. Cl.
CPC ............. *B62D 25/20* (2013.01); *B60K 1/04* (2013.01); *B60R 16/0215* (2013.01); *B60R 16/0231* (2013.01); *B60K 2001/0438* (2013.01)

(58) Field of Classification Search
CPC .. C07D 401/12; C07D 405/14; C07D 409/14; A61P 35/00; G06N 20/00; H02G 3/185; H02G 3/283; H02G 3/285; H02G 3/00; E04B 5/48
See application file for complete search history.

(56) References Cited

U.S. PATENT DOCUMENTS

| | | | |
|---|---|---|---|
| 5,957,714 A * | 9/1999 | Johnson | H01R 31/00 439/225 |
| 7,111,900 B2 | 9/2006 | Chernoff et al. | |
| 7,978,481 B2 | 7/2011 | Tsuchiya et al. | |
| 8,946,551 B2 | 2/2015 | Hudson et al. | |
| 11,364,956 B2 * | 6/2022 | Berels | B62D 25/20 |
| 2013/0169041 A1 * | 7/2013 | Fukaya | H02G 3/00 307/10.1 |
| 2014/0305697 A1 * | 10/2014 | Hudson | H02G 1/06 174/72 A |
| 2019/0237721 A1 | 8/2019 | Reimer et al. | |
| 2021/0394780 A1 * | 12/2021 | Thomas | B62D 25/2009 |

FOREIGN PATENT DOCUMENTS

| | | |
|---|---|---|
| IN | 201641032884 | 3/2018 |
| JP | 2011182589 A | 9/2011 |
| JP | 6347541 B2 | 6/2018 |
| JP | 2019137394 A | 8/2019 |
| WO | 2020137614 A1 | 7/2020 |

\* cited by examiner

*Primary Examiner* — Kiran B Patel
(74) *Attorney, Agent, or Firm* — David B. Kelley; Carlson, Gaskey & Olds, P.C.

(57) ABSTRACT

This disclosure relates to a motor vehicle floor assembly configured to facilitate electrical connections and/or airflow within the vehicle, and a corresponding method. An example assembly includes a floor including an electrical line arranged entirely within the floor. In another example assembly, the floor additionally or alternatively includes an air flow path.

12 Claims, 5 Drawing Sheets

MOTOR VEHICLE FLOOR ASSEMBLY CONFIGURED TO FACILITATE ELECTRICAL CONNECTIONS AND AIRFLOW

TECHNICAL FIELD

This disclosure relates to a motor vehicle floor assembly configured to facilitate electrical connections and airflow within the vehicle.

BACKGROUND

Electrified vehicles differ from conventional motor vehicles because electrified vehicles are selectively driven using one or more electric machines powered by a traction battery. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs). The traction batteries of electrified vehicles can include a battery pack secured to an underbody of the vehicle.

SUMMARY

An assembly for a motor vehicle according to an exemplary aspect of the present disclosure includes, among other things, a floor including an electrical line arranged entirely within the floor.

In a further non-limiting embodiment of the foregoing assembly, the electrical line extends to a first electrical module in a first pocket beneath an uppermost surface of the floor.

In a further non-limiting embodiment of any of the foregoing assemblies, the electrical line is one of a wire, wire harness, a bus bar, and a circuit trace, and the first electrical module is one of a printed circuit board and an electrical connector.

In a further non-limiting embodiment of any of the foregoing assemblies, the floor forms a bottom wall and four side walls of the first pocket such that the first pocket is only accessible from a location above the uppermost surface.

In a further non-limiting embodiment of any of the foregoing assemblies, the assembly includes a cover attached to the uppermost surface and sealing the first pocket from the location above the uppermost surface.

In a further non-limiting embodiment of any of the foregoing assemblies, the floor forms a bottom wall and three side walls of the first pocket, the first pocket is arranged adjacent an edge of the floor, and the three side walls are arranged such that the first pocket is accessible from a location above the uppermost surface and a location adjacent the edge.

In a further non-limiting embodiment of any of the foregoing assemblies, the electrical line extends between the first electrical module and a second electrical module arranged in a second pocket beneath the uppermost surface.

In a further non-limiting embodiment of any of the foregoing assemblies, the first and second electrical modules are electrical connectors.

In a further non-limiting embodiment of any of the foregoing assemblies, the electrical line extends between a first connector adjacent a front edge of the floor and a second connector adjacent a rear edge of the floor.

In a further non-limiting embodiment of any of the foregoing assemblies, the electrical line is a first electrical line, and the assembly further comprises a first electrical module arranged in a first pocket arranged beneath an uppermost surface of the floor and electrically connected to the first electrical line.

In a further non-limiting embodiment of any of the foregoing assemblies, the assembly further comprises a second electrical line extending between a third connector adjacent the front edge of the floor and a fourth connector adjacent the rear edge of the floor, the assembly further comprises second, third, fourth, fifth, and sixth electrical modules arranged in respective second, third, fourth, fifth, and sixth pockets arranged beneath the uppermost surface, and each of the second third, fourth, fifth, and sixth electrical modules are electrically connected to one of the first and second electrical lines.

In a further non-limiting embodiment of any of the foregoing assemblies, the floor also provides an upper cover of an enclosure of a battery assembly, and the motor vehicle is an electrified vehicle.

A method according to an exemplary aspect of the present disclosure includes, among other things, electrically connecting a first load to a second load via an electrical line. The electrical line is arranged entirely within in a floor of a motor vehicle.

In a further non-limiting embodiment of the foregoing method, the floor is a cover of a battery assembly of the motor vehicle.

BRIEF DESCRIPTION OF THE DRAWINGS

FIG. 3 is a top view of the battery cover of FIG. 2. FIG. 3 illustrates an example arrangement of electrical lines, bus bars, and flow paths.

DETAILED DESCRIPTION

This disclosure relates to a motor vehicle floor assembly configured to facilitate electrical connections and/or airflow within the vehicle, and a corresponding method. An example assembly includes a floor including an electrical line arranged entirely within the floor. In another example assembly, the floor additionally or alternatively includes an air flow path. This disclosure can be used to facilitate various different electrical connections and/or airflow via the floor in a relatively compact package. These and other benefits will be appreciated from the below description.

Figure 1:
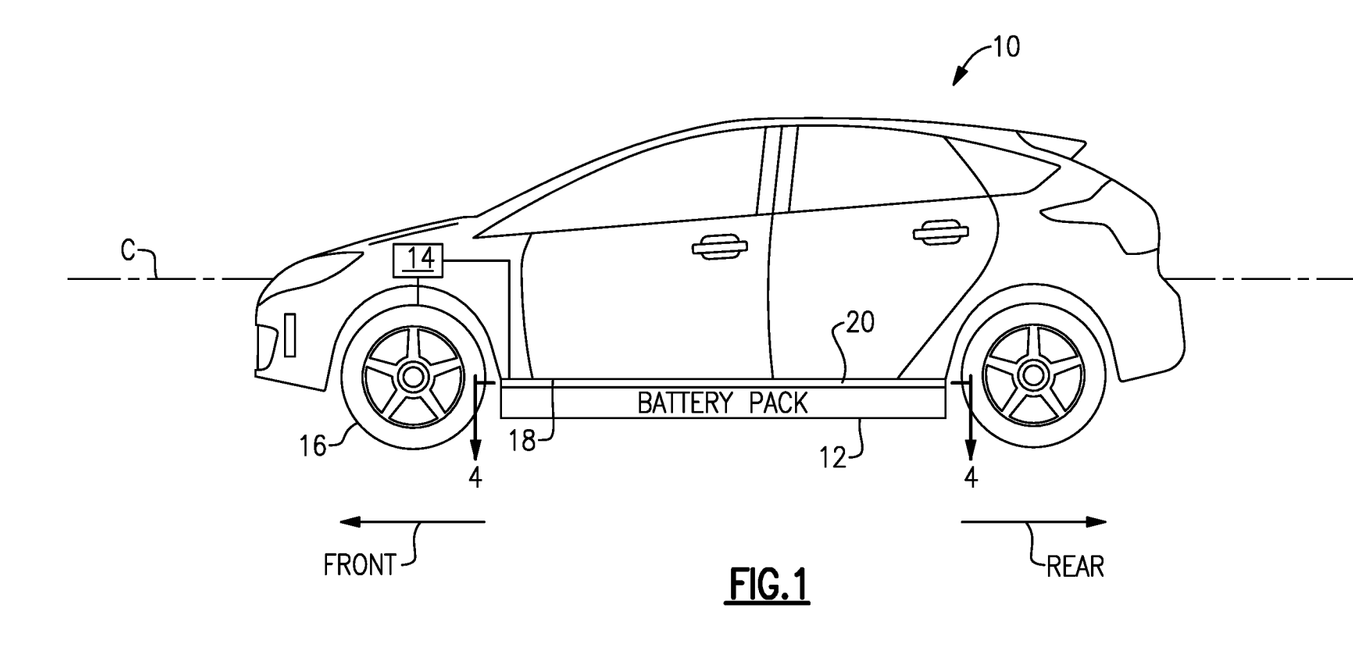
FIG. 1 is a somewhat schematic, side view of an example motor vehicle.

Referring to FIG. 1, an example motor vehicle 10 ("vehicle 10"), which in this example is an electrified vehicle, includes a battery pack 12 ("battery 12") that powers an electric machine 14. The vehicle includes wheels 16 driven by the electric machine 14. The electric machine 14 receives electric power from the battery 12 and converts the electric power to torque to drive the wheels 16. The battery 12 is a relatively high voltage (e.g., greater than or equal to 60 $V_{DC}$, 30 $V_{AC}$) battery in this example.

The vehicle 10 in FIG. 1 is an all-electric vehicle. In other examples, the vehicle 10 is a hybrid electric vehicle, which selectively drives wheels using torque provided by an internal combustion engine instead of, or in addition to, the electric machine 14. This disclosure also extends to motor vehicles which are not electrified vehicles such as those that are driven solely by an internal combustion engine.

The vehicle 10 includes an underbody 18. The battery 12 is secured adjacent the underbody 18. In this example, an upper, or top, cover 20 of the battery 12 provides a floor of a passenger cabin of the vehicle 10. In one example, the cover 20 is not directly exposed to passengers, and may be covered by carpet, padding, and/or upholstery. The cover 20, in this example, serves as a portion of an enclosure assembly of the battery 12 and also as the floor of the passenger cabin of the vehicle 10. In this example, the enclosure assembly of the battery 12 includes portions of the vehicle frame, such as the side rails. In other examples, the enclosure assembly includes a tray and one or more walls. In either example, the cover 20 is configured to enclose and seal an interior of the battery 12, which contains one or more arrays of battery cells. The cover 20 may be formed separately from or integrally with the other walls/tray of the enclosure assembly.

As mentioned above, this disclosure extends to vehicles which are not electrified vehicles. Such vehicles do not include the battery 12. In this sense, the cover 20 is representative of a panel providing a floor of the vehicle 10. The cover 20 may be referred to as a floor herein.

Figure 2:
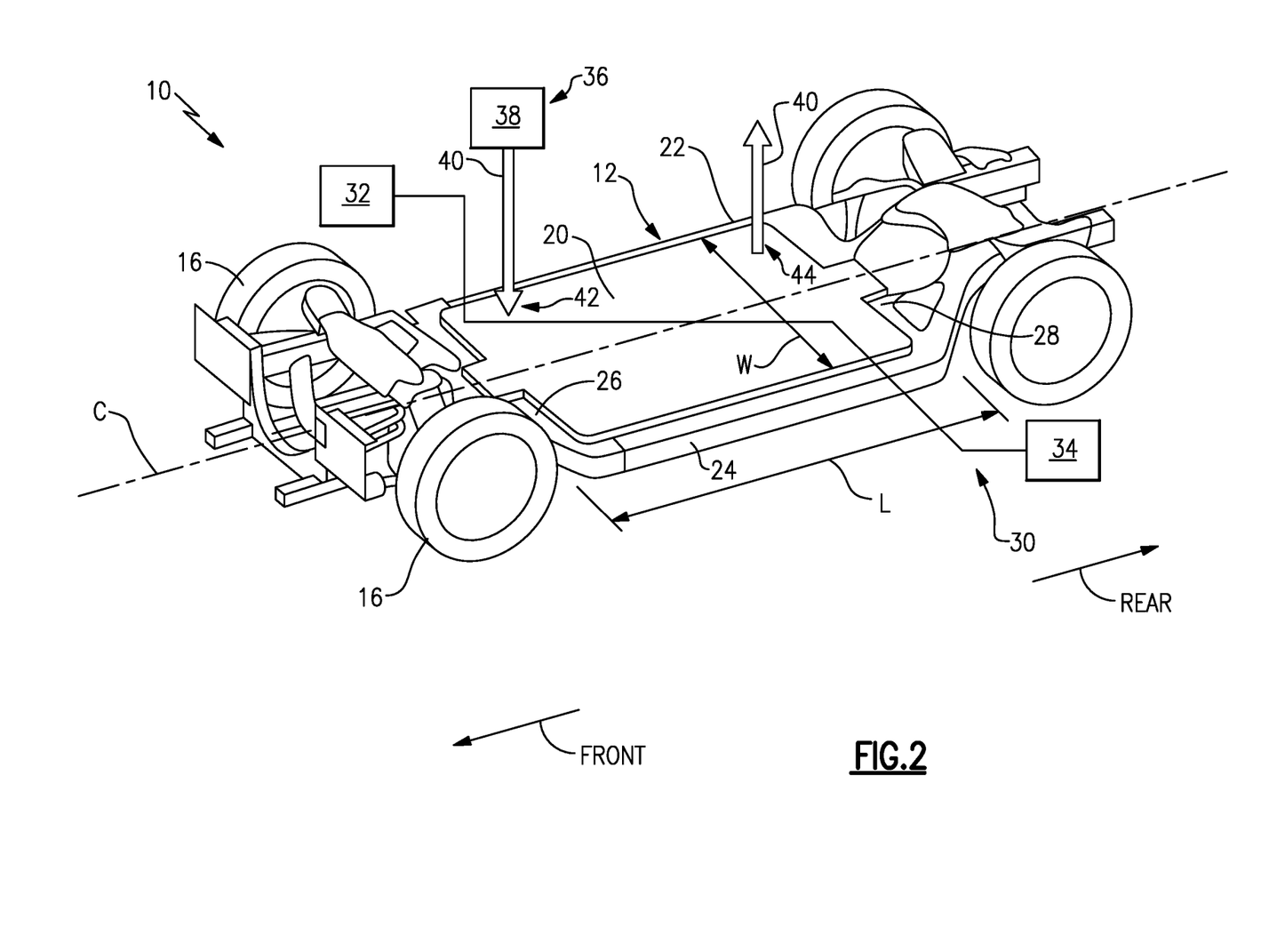
FIG. 2 is a perspective view of a portion of a frame of the vehicle and a battery cover. In the example of FIG. 2, the battery cover also provides a floor of the vehicle.

FIG. 2 illustrates the cover 20 relative to portions of a frame of the vehicle 10. In FIG. 2, the cover 20 is arranged between frame rails 22, 24, which are structures extending along opposed sides of the vehicle 10 in directions generally parallel to a centerline C of the vehicle 10. The centerline C extends in the "front" and "rear" directions, which are labeled in some figures for reference. The cover 20 has a length L extending in a direction parallel to the centerline C, and a width W extending in a direction normal to the centerline C. In this example, the width W is such that the cover 20 contacts both frame rails 22, 24. The rails 22, 24 are connected together by a plurality of cross-members 26, 28 extending in a direction substantially normal to the centerline C. In this example, the length L of the cover 20 extends along a majority of a length of the vehicle 10, from substantially an A-pillar of the vehicle to a C-pillar or D-pillar, if present.

The cover 20 may be made of a polymer material, in one example, and may be made using a known manufacturing technique. In a particular example, the cover 20 may be made using a sheet molding compound (SMC) process, and may be made of a reinforced composite SMC material including glass-fiber reinforced polyester, for example.

This disclosure uses the cover 20 to facilitate electrical connections within the vehicle 10, and is particularly useful in making relatively direct connections between electrical loads and/or power sources which are arranged on opposite sides of the vehicle 10. The cover 20 further facilitates electrical connections to various vehicle modules, such as providing power to power seats, instrumentation panels, sensors, occupancy sensors, seat cooling/heating, consoles, etc., within the vehicle 10. Further still, the cover 20 is configured to direct airflow within the vehicle 10 such that the need for separate ducts or conduits is reduced.

The vehicle 10 includes an electrical distribution system ("EDS") 30, which electrically couples power sources and/or electrical loads to one another. As one example, the electrical distribution system 30 electrically couples a first load 32 to a second load 34 via electrical lines and electrical modules which have been routed using the cover 20. The first and second loads 32, 34 could include the battery 12, electric machine 14, or other loads. One of the first and second loads 32, 34 may be a power source. The electrical distribution system 30 includes one or more electrical wires, electrical cables, bus bars (sometimes spelled "busbars"), circuit traces, electrical connectors, etc., as necessary to electrically couple electrical components to one another. Portions of the electrical distribution system 30 may be attached or adhered to the cover 20. Other portions of the electrical distribution system 30 may be arranged entirely within the cover 20.

The vehicle 10 further includes a heating, ventilation, and air conditioning system 36 which includes, among other things, a blower 38 configured to direct a flow of air 40 within the vehicle 10. The cover 20 is configured with a flow path, an example of which will be discussed below, such that the air 40 can enter the cover 20 from an upstream, forward location 42 and flow to a downstream, rearward location 44, or vice versa. The cover 20 can be connected to various conduits and ducts within the vehicle 10 to direct the flow of air 40 as desired within the vehicle 10.

Figure 3:
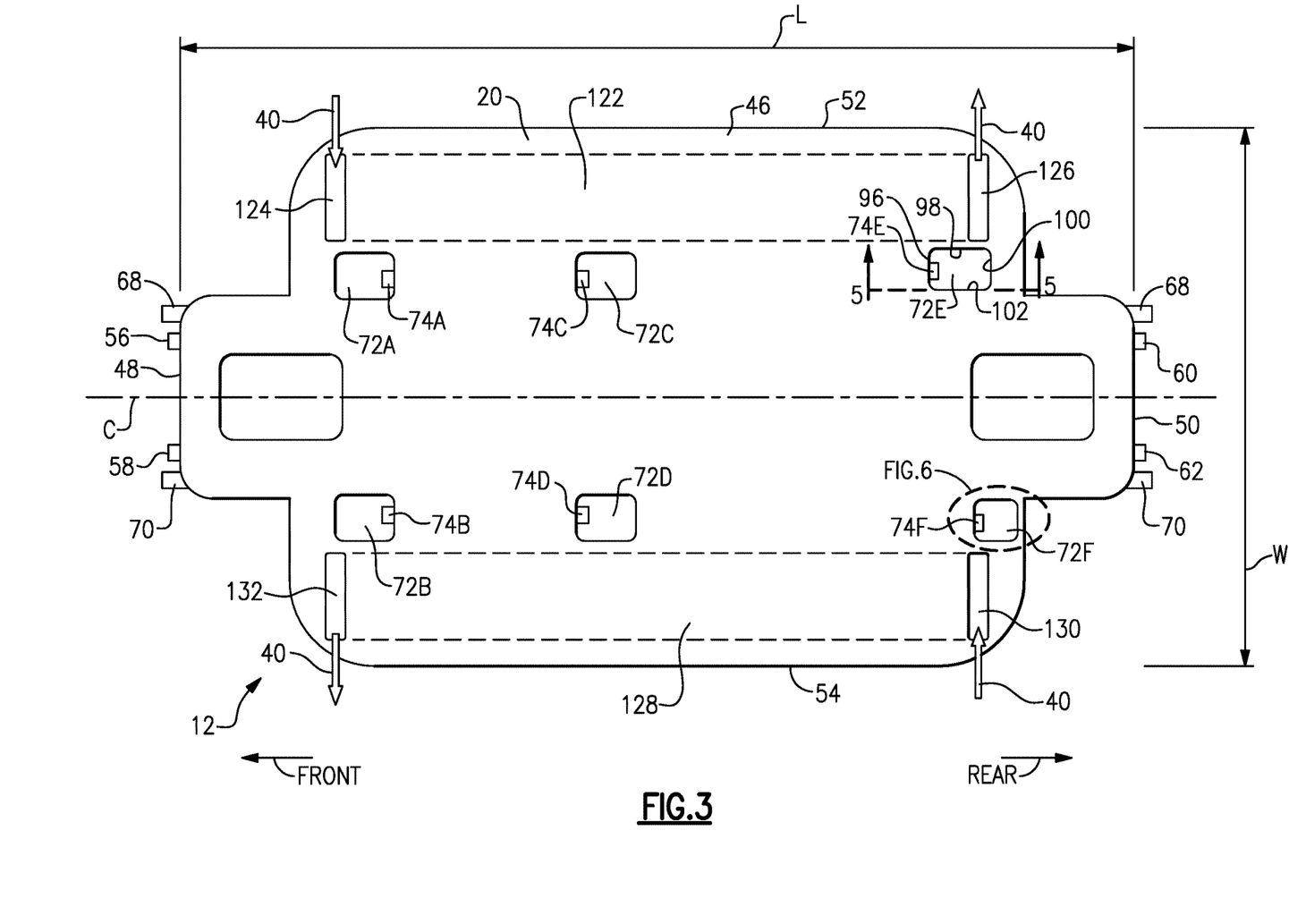
Figure 4:
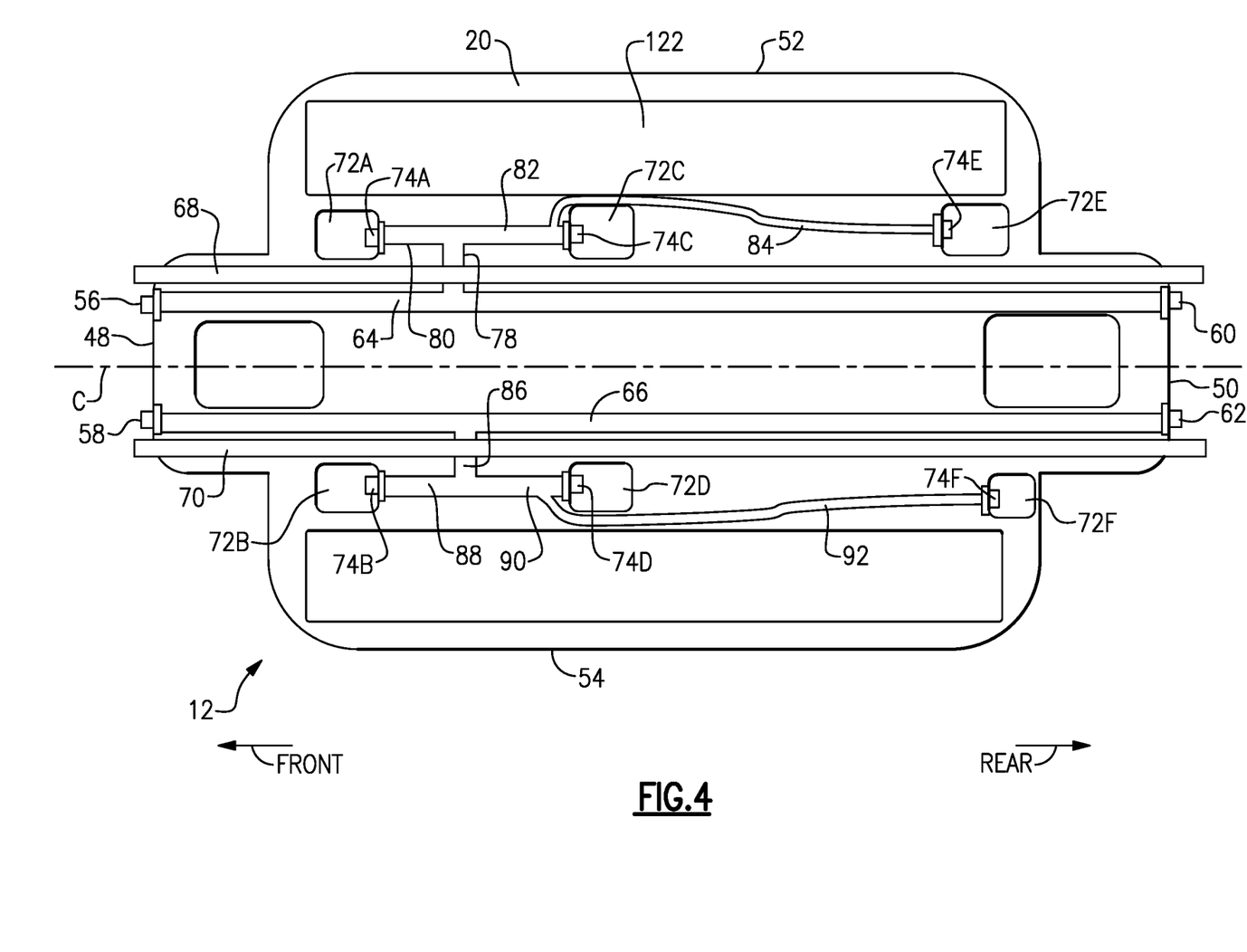
FIG. 4 is a cross-sectional view of the battery cover taken along line 4-4 in FIG. 1 and, in particular, illustrates additional detail of the example arrangement of electrical lines, bus bars, and flow paths.

FIG. 3 is a top view of the cover 20 and illustrates an example arrangement of the cover 20, including an example arrangement of pockets, flow paths, bus bars, and electrical connectors, among other things. FIG. 4 is a cross-sectional view the cover 20 from a perspective similar to that of FIG. 3, but illustrates detail of the example arrangement of the cover 20 beneath the uppermost surface 46 of the cover 20. The aspects of the cover 20 pertaining to facilitating electrical connections will be described first, followed by the aspects of the cover 20 pertaining to facilitating communication of airflow.

With joint reference to FIGS. 3 and 4, the length L of the cover 20 extends between a front edge 48 and a rear edge 50 of the cover 20. The width W of the cover 20 extends between a passenger side 52 and a driver side 54. The front edge 48 includes two electrical connectors 56, 58, and the rear edge 50 includes two electrical connectors 60, 62, in this example. The electrical connectors 56, 58 project at least partially forward of the front edge 48 and the electrical connectors 60, 62 project at least partially rearward of the rear edge 50. The electrical connectors 56, 58, 60, 62, in one example, are plugs mounted to the exterior of the cover 20 and configured to electrically connect to various electrical components, such as loads 32, 34 directly or indirectly via an intermediate electrical line.

With specific reference to FIG. 4, the cover 20 includes a first electrical line 64 electrically connected between the electrical connectors 56 and 60. The cover 20 further includes a second electrical line 66 electrically connected between the electrical connectors 58, 62. The first and second electrical line 64, 66 are useful in making connections between electrical components on opposite ends of the vehicle 10. In this regard, the first and second electrical lines 64, 66 are configured to direct power and/or electrical signals between the front and rear edges 48, 50.

As shown in the example of FIG. 4, the first and second electrical lines 64, 66 extend substantially parallel to the centerline C and to one another. The first and second electrical lines 64, 66 are arranged entirely within the cover 20, such that the cover 20 fully surrounds the first and second electrical lines 64, 66. Only the electrical connectors 56, 58, 60, 62, which are connected to the first and second electrical lines 64, 66, project outward of the cover 20. In an example, the first and second electrical lines 64, 66 are fully embedded in the material of the cover 20, and the cover 20 fully encases the first and second electrical lines 64, 66. In this disclosure, reference to an electrical line being arranged entirely within the cover 20 does not mean that the electrical line is within the same space occupied by the battery cells of the battery assembly 12.

The cover 20 further includes first and second bus bars 68, 70. The first and second bus bars 68, 70 extend parallel to the centerline C and to one another. A majority of the first and second bus bars 68, 70 are arranged fully internal to the cover 20, however ends of the bus bars 68, 70 project from the front and rear edges 48, 50 to facilitate connections to other electrical components of the vehicle 10, including, in some examples, the first and second loads 32, 34. Like the first and second electrical lines 64, 66, the first and second bus bars 68, 70 are configured to direct power and/or electrical signals between electrical components on opposite ends of the vehicle 10, namely between the front and rear edges 48, 50. In a particular example, the first and second bus bars 68, 70 are configured to direct bulk power, such as power going to or from the electric machine 14, within the vehicle 10.

In addition to directing power from one end of the cover 20 to the other, the first and second electrical lines 64, 66 are configured to direct power to other locations between the front and rear edges 48, 50 of the cover 20. In this example, the cover 20 includes a plurality of pockets 72A-72F each including an electrical module electrically coupled to one of the first and second electrical lines 64, 66. In this example, the electrical modules are electrical connectors 74A-74F, with each connector arranged in a corresponding, respective pocket 72A-72F. The electrical connectors 74A-74F may electrically connect to other electrical components, such as components configured to power or control a particular aspect of the vehicle 10.

The pockets 72A-72F are positioned such that they are in close proximity to a particular electrical component of the vehicle 10. In an example, the pockets 72A, 72B are positioned beneath a dash panel, and are used in that example to facilitate electrical connections to the dashboard. In this example, the pockets 72C, 72D are positioned beneath the passenger and driver seats, respectively, and may facilitate electrical connections to powered passenger and driver seats. Finally, the pockets 72E, 72F may facilitate electrical connections to electrical components further rearward in the vehicle 10, such as a rear view camera, rear lighting, a power liftgate, etc. This disclosure extends to other arrangements of the pockets 72A-72F, including covers with a different number of pockets. This disclosure extends to covers without any pockets.

The electrical connectors 74A-74F are connected to side walls of the pockets 72A-72F such that a plug, such as a plug of another electrical component, can be plugged into the electrical connectors 74A-74F to complete an electrical connection. The pockets 72A-72F are sized and configured to receive a plug and/or another electrical component.

In this example, electrical connector 74A is electrically connected to the first electrical line 64 via a first branch 78, which is electrically connected to and projects directly from the first electrical line 64, and a second branch 80 electrically connected to the first branch 78. The electrical connector 74C is electrically connected to the first electrical line 64 via a third branch 82, which is also electrically connected to the first branch 78. The electrical connector 74E is electrically connected to the first electrical line 64 via an electrical connection between the third branch 82 and a fourth branch 84. A similar arrangement exists between the electrical connectors 74B, 74D, 74F relative to the second electrical line 66. In particular, electrical connector 74B is electrically connected to the second electrical line 66 via a fifth branch 86, which is electrically connected directly to the first electrical line 66, and a sixth branch 88. The electrical connector 74D is electrically connected to the second electrical line 66 via a seventh branch 90, which is also electrically connected to the fifth branch 86. And, the electrical connector 74F is electrically connected to the second electrical line 64 via an eighth branch 92 electrically connected to the seventh branch 90.

In an example, the first electrical line 64 is a single electrical harness which includes the first electrical line 64 and each of the branches 78, 80, 82, 84. Likewise, in that example, the second electrical line 66 is another electrical harness, separate from that of the first electrical line 64, and includes the second electrical line 66 and each of the branches 86, 88, 90, 92. In those examples, the entirety of the harnesses providing the first electrical line 64 and the second electrical line 66, and each of the branches, is arranged fully within the cover 20. Only the electrical connectors 56, 58, 60, 62, 74A-74F are accessible from an exterior of the cover 20.

In this regard, the cover 20 may be overmolded over the first and second electrical lines 64, 66. Alternatively, the cover 20 may include internal channels configured to receive the first and second electrical lines 64, 66. In a particular example, the cover 20 is made of a top half and a bottom half and, in a manufacturing step, the first and second electrical lines 64, 66 are arranged between the two halves before the two halves are connected together to form the final cover.

While wire harnesses are mentioned herein, the first and second electrical lines 64, 66 and the branches 78, 80, 82, 84, 86, 88, 90, 92 may be provided by one or more cables, bus bars, ribbon cables, wires, circuit traces, painted circuit tracings, etc. Further, each of the first and second electrical lines 64, 66 and the branches 78, 80, 82, 84, 86, 88, 90, 92 may include a single electrical line or multiple electrical lines.

Figure 5:
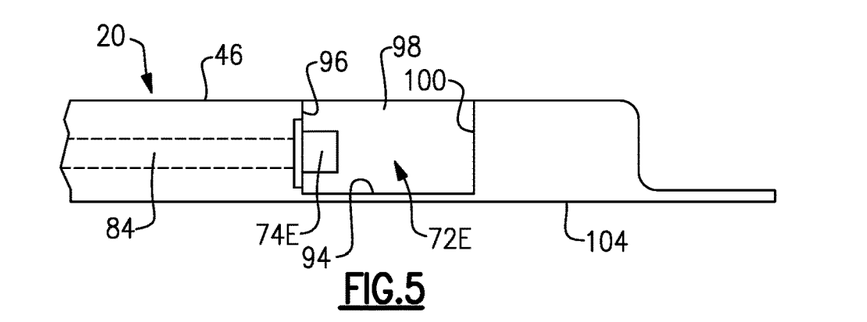
FIG. 5 is a cross-sectional view of a portion of the battery cover taken along line 5-5 in FIG. 3, and specifically illustrates detail of an example pocket.

The pockets 72A-72F are arranged such that they extend below the uppermost surface 46. FIG. 5 illustrates one of the pockets 72E in more detail. One or more of the other pockets may be arranged substantially similarly. In FIG. 5, the pocket 72E includes a bottom wall 94 spaced-apart beneath the uppermost surface 46. The pocket 72E includes four side walls 96, 98, 100, 102 (wall 102 is labeled in FIG. 3) extending between the uppermost surface 46 and the bottom wall 94, and arranged substantially 90° relative to one another. Further, as shown in FIG. 5, the cover 20 includes a bottommost surface 104. The bottom wall 94 of the pocket 72E is spaced-apart above the bottommost surface 104 of the cover 20. The bottom wall 94 and side walls 96, 98, 100, 102 are all formed by the cover 20.

As shown in FIG. 5, the electrical connector 74E is mounted to and projects into the pocket 72E from one of the side walls, namely the side wall 96. The pocket 72E is sized and arranged such that another electrical connector can fit into the pocket 72E and connect to the electrical connector 74E. Further, another electrical module can also fit into the pocket 72E in some examples. In the example of FIG. 5, the side walls 96, 98, 100, 102 are arranged such that the pocket 72E is only accessible from a location above the uppermost surface 46 (i.e., the pocket 72E is only accessible from the top).

Figure 6:
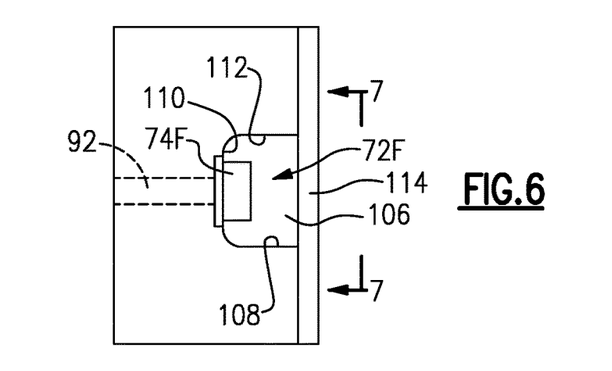
FIG. 6 is a close-up view of the corresponding encircled area in FIG. 3, and specifically is a top view of an example pocket adjacent an edge of the battery cover.
Figure 7:
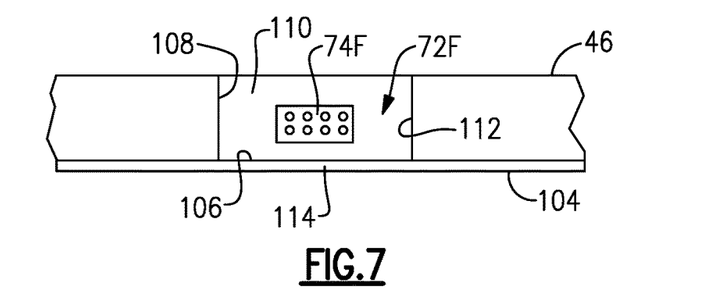
FIG. 7 is an end view of the portion of the battery cover shown in FIG. 6, as viewed along line 7-7 in FIG. 6.

In another example, one or more of the pockets 72A-72F may be accessible from a side location in addition to the top. FIGS. 6 and 7 illustrate such an arrangement relative to the pocket 72F. The pocket 72F includes a bottom wall 106 lying in a common plane with the bottom wall 94, and spaced below the uppermost surface 46 and above the bottommost surface 104. The pocket 72F only includes three side walls 108, 110, 112. The side walls 108, 110, 112 and bottom wall 106 are all formed by the cover 20. The three side walls 108, 110, 112 are arranged such that the pocket 72F is open facing an edge 114 of the cover 20. The edge 114 is a lip, in one example, extending about the entire outer perimeter of the cover 20. The edge 114 is below the uppermost surface 46, and in this example, lies in a common plane with the bottom wall 106. When the edge 114 is present, the electrical connectors 56, 58, 60, 62 may be arranged inside the edge 114 such that when viewed from a top, the edge 114 projects beyond the electrical connectors 56, 58, 60, 62.

Figure 8:
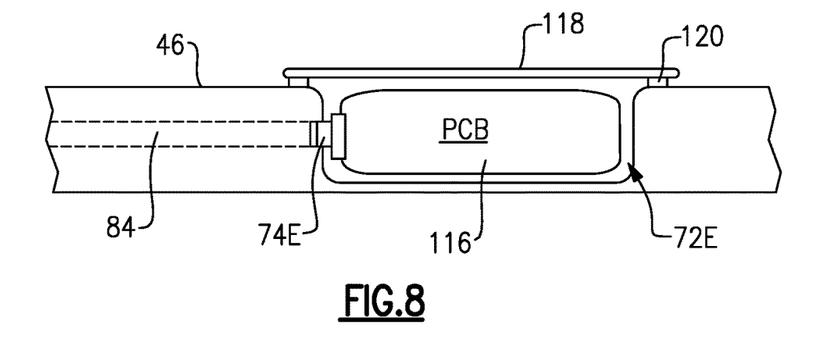
FIG. 8 is a cross-sectional view of the battery cover similar to FIG. 5 and illustrates a pocket cover sealed over an example pocket.

Instead of or in addition to an electrical connector, the pockets 72A-72F could contain another type of electrical module, such as a printed circuit board (PCB) or another type of electrical component such as an inverter, converter, etc. In FIG. 8, the pocket 72E includes a PCB 116 electrically connected to the electrical connector 74E In this example, in order to protect the PCB 116, a pocket cover 118 is attached to the uppermost surface 46 via screws or rivets as examples. A seal 120, such as a gasket, is used in this example to seal the pocket cover 118 relative to the uppermost surface 46 such that the pocket cover 118 and seal 120 together reduce or eliminate ingress of contaminants, for example, into the pocket 72E. The pocket cover 118 and the seal 120 provide an air and water tight connection to the uppermost surface 46, in an example. The PCB 116 may be electrically connected to another component through the pocket cover 118. In that case, a seal may be used to form an electrical connection through the pocket cover 118. In another example, the PCB 116 is electrically connected to other electrical components via the branch 84. One or more of the other pockets can include a pocket cover arranged substantially similar to the pocket cover 118.

In addition to facilitating electrical connections, the cover 20 also facilitates airflow within the vehicle 10. In an example, the cover 20 includes a first flow path 122 (FIG. 4; shown in phantom in FIG. 3) configured as a passageway permitting air 40 to flow therein. Air 40 enters the first flow path 122 via a first inlet 124 formed in the uppermost surface 46 adjacent the front edge 48 and exits the first flow path 122 via a first outlet 126 formed in the uppermost surface 46 adjacent the rear edge 50. The first flow path 122 is arranged adjacent the passenger side 52, in this example, and is configured to direct a flow of air 40 within the first flow path 122 in a direction parallel to the centerline C. The cover 20, in this example, also includes a second flow path 128 arranged substantially similar to the first flow path 122, except that the second flow path 128 is arranged adjacent the driver side 54 of the cover 20. The first and second flow paths 122, 128 are bound on all sides, with the exception of the inlets and outlets, by the cover 20. The second flow path 128 is an independent passageway relative to the first flow path 122 in this example such that air 40 in the respective flow paths 122, 128 does not intermix. Air 40 enters the second flow path 128 via a second inlet 130 formed in the uppermost surface 46 adjacent the rear edge 50 and exits the second flow path 128 via a second outlet 132 formed in the uppermost surface 46 adjacent the front edge 48. In this way, the first flow path 122 provides an air supply and the second flow path 128 provides a return. The opposite could be true, however, such that the air 40 could flow from rear to front through the first flow path 122 and air 40 flows from front to rear through the second flow path 128. Further, the first flow path 122 and the second flow path 128 could both provide supplies in one example. In another example, the first and second flow paths 122, 128 could both provide returns.

In an example, the first and second flow paths 122, 128 are arranged entirely within the cover 20 such that air 40 flowing through the first and second flow paths 122, 128 does not directly contact any battery cells arranged within the battery assembly 12. That said, as the air 40 may be cool, the air 40 may have a cooling effect on the battery assembly 12. While two air paths are in the cover 20, this disclosure extends to covers without air flow paths and further extends to covers with one or more air flow paths.

While a particular configuration of the cover 20 has been shown in the figures and discussed above, it should be understood that modifications of the cover 20 come within the scope of this disclosure. For instance, the cover 20 could include the electrical lines 64, 66, but not the bus bars 68, 70, or vice versa. Further, the cover 20 could include the aspects pertaining to making electrical connections (i.e., the electrical lines 64, 66, bus bars 68, 70, and/or pockets 72A-72F) but not the aspects pertaining to airflow (i.e., the first and second flow paths 122, 128), or vice versa.

It should be understood that terms such as "about," "substantially," and "generally" are not intended to be boundaryless terms, and should be interpreted consistent with the way one skilled in the art would interpret those terms. It should also be understood that directional terms such as "front," "rear," "upper," "beneath," "side," "end," etc., are used herein relative to the normal operational attitude of a vehicle for purposes of explanation only, and should not be deemed limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:
1. An assembly for a motor vehicle, comprising:
 a floor including an electrical line arranged entirely within the floor, wherein the electrical line extends to a first electrical module in a first pocket beneath an uppermost surface of the floor, wherein the electrical line is one of a wire, wire harness, a bus bar, and a circuit trace, and the first electrical module is one of a printed circuit board and an electrical connector, and wherein the floor forms a bottom wall and at least three side walls of the first pocket.

2. The assembly as recited in claim 1, wherein the floor forms four side walls of the first pocket such that the first pocket is only accessible from a location above the uppermost surface.

3. The assembly as recited in claim 2, further comprising a cover attached to the uppermost surface and sealing the first pocket from the location above the uppermost surface.

4. The assembly as recited in claim 1, wherein:
the floor forms a bottom wall and only three side walls of the first pocket,
the first pocket is arranged adjacent an edge of the floor, and
the three side walls are arranged such that the first pocket is accessible from a location above the uppermost surface and a location adjacent the edge.

5. The assembly as recited in claim 1, wherein the electrical line extends between the first electrical module and a second electrical module arranged in a second pocket beneath the uppermost surface.

6. The assembly as recited in claim 5, wherein the first and second electrical modules are electrical connectors.

7. The assembly as recited in claim 1, wherein the electrical line extends between a first connector adjacent a front edge of the floor and a second connector adjacent a rear edge of the floor.

8. The assembly as recited in claim 7, wherein:
the electrical line is a first electrical line, and
the assembly further comprises a first electrical module arranged in a first pocket arranged beneath an uppermost surface of the floor and electrically connected to the first electrical line.

9. The assembly as recited in claim 8, wherein:
the assembly further comprises a second electrical line extending between a third connector adjacent the front edge of the floor and a fourth connector adjacent the rear edge of the floor,
the assembly further comprises second, third, fourth, fifth, and sixth electrical modules arranged in respective second, third, fourth, fifth, and sixth pockets arranged beneath the uppermost surface, and
each of the second third, fourth, fifth, and sixth electrical modules are electrically connected to one of the first and second electrical lines.

10. The assembly as recited in claim 1, wherein:
the floor also provides an upper cover of an enclosure of a battery assembly, and
the motor vehicle is an electrified vehicle.

11. A method, comprising:
electrically connecting a first load to a second load via an electrical line, wherein the electrical line is arranged entirely within in a floor of a motor vehicle, wherein the electrical line extends to an electrical module in a pocket beneath an uppermost surface of the floor, wherein the electrical line is one of a wire, wire harness, a bus bar, and a circuit trace, and the electrical module is one of a printed circuit board and an electrical connector, and wherein the floor forms a bottom wall and at least three side walls of the pocket.

12. The method as recited in claim 11, wherein the floor is a cover of a battery assembly of the motor vehicle.

* * * * *